(12) United States Patent
Novak et al.

(10) Patent No.: US 8,640,910 B2
(45) Date of Patent: Feb. 4, 2014

(54) PRESSURE CONTAINER

(75) Inventors: Pavel Novak, Graz (AT); Andreas Zieger, Hofstaetten an der Raab (AT); Alexander Schaerfl, Graz (AT)

(73) Assignee: Magna Steyr Fahrzeugtechnik AG & Co KG, Graz (AT)

( * ) Notice: Subject to any disclaimer, the term of this patent is extended or adjusted under 35 U.S.C. 154(b) by 37 days.

(21) Appl. No.: 13/096,625

(22) Filed: Apr. 28, 2011

(65) Prior Publication Data

US 2011/0284562 A1 Nov. 24, 2011

(30) Foreign Application Priority Data

Apr. 29, 2010 (DE) .......................... 10 2010 018 700

(51) Int. Cl.
*F17C 13/06* (2006.01)
*F17C 1/06* (2006.01)
*F16J 13/02* (2006.01)

(52) U.S. Cl.
CPC ................. *F16J 13/02* (2013.01); *F17C 13/06* (2013.01); *F17C 1/06* (2013.01)
USPC .......................................... 220/582; 220/566

(58) Field of Classification Search
CPC .............. F17C 13/04; F17C 1/06; F17C 1/04; F17C 1/02; F17C 1/16; F17C 13/06
USPC ........... 220/745, 586, 582, 581, 303, 203.19, 220/203.11, 203.01, 203.24, 203.28; 206/0.6; 222/547
IPC ................. B65D 51/16; F17C 1/06, 1/04, 13/06
See application file for complete search history.

(56) References Cited

U.S. PATENT DOCUMENTS 1,966,241 A * 7/1934 Furrer ........................... 220/581
(Continued)

FOREIGN PATENT DOCUMENTS

BE 902543 9/1985
DE 19751411 1/1999
(Continued)

OTHER PUBLICATIONS

Translation of GOTO (JP 2007292235) Nov. 8, 2007.*

*Primary Examiner* — Robert J Hicks
(74) *Attorney, Agent, or Firm* — Bachman & LaPointe, P.C.

(57) ABSTRACT

A pressure container comprising a plastic container core (2) for storing a fluid under pressure, a support sheath (3) surrounding the plastic container core (2), a connection piece (4) formed at the plastic container core (2) and having an opening (5) for filling in and discharging the fluid from the plastic container core (2), a connection body (6) arranged radially outside the connection piece (4) and having a bore (7), a valve body (8) having a fluid duct (9) for conducting the fluid in and out through the opening (5) in the connection piece (4), wherein the valve body (8) is arranged in the opening (5) of the connection piece (4) and in the bore (7) of the connection body (6), wherein the connection body (4) has at least one radially inside annular groove (12) and a second seal (13) is arranged in the at least one radially inside annular groove (12), so that the second seal (13) rests radially outside on the connection piece (4).

6 Claims, 3 Drawing Sheets

(56) References Cited

U.S. PATENT DOCUMENTS

| | | | |
|---|---|---|---|
| 5,839,600 A * | 11/1998 | Moreira et al. | 220/560.04 |
| 6,186,356 B1 * | 2/2001 | Berkley et al. | 220/582 |
| 6,230,922 B1 | 5/2001 | Rasche et al. | |
| 2008/0111322 A1 * | 5/2008 | Otsubo et al. | 277/654 |
| 2008/0251520 A1 * | 10/2008 | Ota et al. | 220/586 |
| 2009/0255940 A1 * | 10/2009 | Murate et al. | 220/592 |
| 2009/0266816 A1 * | 10/2009 | Holroyd et al. | 220/203.01 |

FOREIGN PATENT DOCUMENTS

| | | | |
|---|---|---|---|
| DE | 102007011211 | 8/2008 | |
| EP | 0203631 | 12/1986 | |
| FR | 2600750 | 12/1987 | |
| GB | 2298026 A * | 8/1996 | G05D 16/10 |
| JP | 2007292235 A * | 11/2007 | F17C 13/04 |
| WO | 2010142303 | 12/2010 | |

* cited by examiner

PRESSURE CONTAINER

BACKGROUND OF THE INVENTION

The present invention relates to a pressure container.

Pressure containers are used for the most varied technical applications for storing or retaining fluids, i.e. liquids or gases. A plastic container core manufactured, for example, by means of blow molding is surrounded by a support sheath made of a composite wrapping. Thereby the pressure forces exerted on the plastic container core due to pressure by the fluid can be taken up by the composite wrapping. At least one connection piece having an opening is formed at the plastic container core. A valve body is arranged in the opening, wherein the fluid can be introduced into and bled off from the interior space of the pressure container by means of the valve body through a fluid duct in the valve body and thus also through the opening, because the valve body is arranged in the opening of the connection piece at the plastic container core.

DE 197 51 411 C1 shows a composite pressure container for storing gaseous media under pressure, having a plastic liner and two neck pieces arranged in the neck region as well as a wrapping of a fiber composite material reinforcing the liner. A neck piece is formed for receiving a valve, wherein the neck piece is provided for receiving the valve with a clamping ring, which can be screwed therein and the outer sheath of which is provided with a threaded portion adjoined by a thread-free, frustoconical portion, and wherein an annular groove arranged between the internally threaded portions of the neck piece for receiving a sealing ring extends radially into the neck piece and at least one corrugation is provided extending outwardly over the entire circumference at the outside of the respective neck piece in the region adjoining the collar. According to a preferred embodiment, the required height of the neck piece increases due to the fact that the clamping ring is used. As a result, the costs of material are increased. Moreover, the construction space available in the vehicle can thus not be used optimally. Furthermore, it is not possible to tune the sealing elements for high and low temperatures.

BE 902 543 A2 also shows a pressure container having a plastic container core and a support sheath surrounding the plastic container core. Therein a two-part embodiment of the neck piece is used in the neck region, wherein the part of the neck piece located within the plastic core container must either be inserted in the plastic core container already during manufacturing thereof, or the plastic core container must be embodied in two parts. Both variants result in considerable extra expense for production and process safety. The inner sealing element in the variant as shown in FIG. 1 with two sealing elements does not have any sealing function, because the pressure inside the container can be propagated via the thread of the two neck pieces.

DE 10 2007 011 211 B3 discloses a pressure container for storing liquid or gaseous media. A plastic container core has at least one cylindrical collar arranged in the radial clearance between a metal cylinder inserted therein and a metal body enclosing the outside of the collar and having a flange protruding radially outwardly, wherein the metal cylinder has at least one radially outwardly open groove, into which at least one O-ring seal, which is adapted in a sealing manner to the collar, is inserted, wherein an externally threaded metal armature is screwed into the end of the metal body facing away from the metal cylinder and wherein the plastic container core and the flange are at least partially enclosed by a support sheath made of a fiber composite material. Therein the metal cylinder forms a one-piece component of the metal armature and is joined immediately to the external thread and has a gradually smaller external diameter than the external thread. Therein the plastic container core together with at least one O-ring seal is pressed between the metal body and the metal cylinder, wherein the plastic container core is connected to the metal body by means of a thread and the at least one O-ring seal lies level with this thread. Manufacturing this thread at the plastic container core leads to accumulations of material and thus to manufacture-related sink marks in this region. If the O-ring is arranged in this region, this reduces the sealing effect.

The object of the present invention is to provide a pressure container, wherein the valve body is attached reliably in a fluid-tight manner to a connection piece of a plastic container core and wherein the valve body and a connection body have a small constructional height. Further, manufacturing the pressure container is to be inexpensive.

SUMMARY OF THE INVENTION

The foregoing object is achieved by a pressure container comprising a plastic container core for storing a fluid under pressure, a support sheath surrounding the plastic container core, at least one connection piece formed at the plastic container core and having an opening for filling in and discharging the fluid from the plastic container core, a connection body arranged radially outside the connection piece and having a bore, a valve body having one or more fluid ducts for conducting the fluid in and out through the opening in the connection piece, wherein the valve body is arranged in the opening of the connection piece and in the bore of the connection body, preferably at least one annular groove incorporated radially outside in the valve body, each having one first seal arranged in the at least one annular groove, so that the at least one first seal rests radially inside on the connection piece, wherein the connection body has at least one radially inside annular groove and a second seal is arranged in each of the at least one annular groove, so that the at least one second seal rests radially outside on the connection piece.

In a further embodiment, the at least one annular groove is formed at the connection body at a portion of the connection body resting radially outside on the connection piece.

In a supplementary variant, the connection body rests directly on the plastic container core, especially on the connection piece of the plastic container core, and/or the valve body rests directly on the connection piece of the plastic container core, the valve body being arranged within the opening of the connection piece. The connection body rests radially inside, i.e. at the bore of the connection body in a partial portion, as seen in the axial direction, immediately on the plastic container core, especially on the connection piece of the plastic container core.

Appropriately, a first thread is formed at the plastic container core, especially at the connection piece of the plastic container core, and a second thread is formed at the connection body, and the first and second threads are screwed together, so that the plastic container core is connected to the connection body by means of the first and second threads. The first thread is formed radially outside at the connection piece of the plastic container core, i.e. the first thread constitutes an external thread at the connection piece, and the second thread is formed as an internal thread at the connection body radially inside at the bore of the valve body. The first thread is screwed into the second thread or vice versa, thereby creating a connection between the connection piece of the plastic container core and the connection body. Thus the connection body is attached axially to the connection piece of the plastic container core.

In a supplementary embodiment, the first thread is formed radially outside on the connection piece and the second thread is formed radially inside on the connection body.

In an additional embodiment, the connection piece of the plastic container core is arranged between the connection body and the valve body; in particular, the connection piece is arranged between the valve body and the connection body under a radial prestress, so that thereby a radial movement of the connection piece due to thermal strain is prevented, because the connection piece is clamped between the valve body and the connection body.

In an additional embodiment, solely the at least one second seal is arranged between the connection body and the plastic container core, especially the connection piece, and/or the first seal and/or the second seal are arranged at a region of the connection piece where both sides thereof are free from threads.

In a supplementary embodiment, the connection body and/or the valve body at least in part, especially in whole, consists of metal, for example, steel or aluminum, and/or the connection body is formed in one piece.

Preferably, the connection body is provided with a third thread and the valve body is provided with a fourth thread and the third and fourth threads are screwed together, so that the valve body is connected to the connection body by means of the third and fourth threads, and/or the valve body rests immediately on the connection body. The third thread is formed as an internal thread at the connection body radially inside at the bore, and the fourth thread is formed as an external thread radially outside on the valve body. Thus the valve body can be axially attached to the connection body by screwing the third thread into the fourth thread or vice versa.

In an additional embodiment, the connection piece of the plastic container core is arranged between the connection body and the valve body. Preferably the connection piece is arranged under prestress between the connection body and the valve body, so that thereby the connection piece is attached radially between the connection body and the valve body and thus a movement in the axial direction at the connection piece due to thermal influences is essentially prevented.

In an additional variant, solely the at least one first seal is arranged between the connection piece of the plastic container core and the valve body.

In a supplementary embodiment, a third thread is arranged between the valve body and the connection body, especially in a recess at the connection body. Thus the third seal seals off the valve body and the connection body against one another.

In a further variant, the first and/or second and/or third seal is embodied as an O-ring seal.

Preferably, a movable valve slide is arranged at the valve body for opening and closing the fluid duct. The movable valve slide is not an integral part of the valve body, so that even if a movable valve slide or other components or parts are arranged at the valve body, the valve body can still be formed also in one piece.

In a supplementary embodiment, the support sheath is made up of a composite wrapping, especially of a fiber wrapping made, for example, of carbon or glass fibers, having a matrix made of thermosetting plastics or thermoplastics.

In an additional variant, the plastic container core is manufactured by means of blow molding, rotational sintering or thermoforming.

According to a special embodiment, the valve body, especially the valve body in a portion arranged within the connection body, and/or the connection body and/or the bore and/or the connection piece have preferably an annular cross section. On the other hand, the above-mentioned components can also be embodied with a different cross section, for example, with a square or rectangular cross section. The term "radial or tangential orientation" as used in this patent application in the case of an annular embodiment or a circular embodiment of these components, for example, "a radially outside or a radially inside orientation", is applied in analogous manner in the case of a geometry of these components where the cross section is oriented in a rectangular or square shape.

According to a special embodiment it is appropriate to embody the cross section of the bore in the connection body in a circular, elliptical, rectangular or square shape.

In a further embodiment, only the connection body with the at least one seal is arranged in the opening of the connection piece.

In a further variant, only the connection body and the at least one second seal rest radially outside on the connection piece.

In an additional embodiment, the plastic container core is rotationally symmetric.

BRIEF DESCRIPTION OF THE DRAWINGS

Hereinafter exemplary embodiments of the invention will be described in greater detail with reference to the accompanying drawings, wherein.

DETAILED DESCRIPTION

Figure 1:
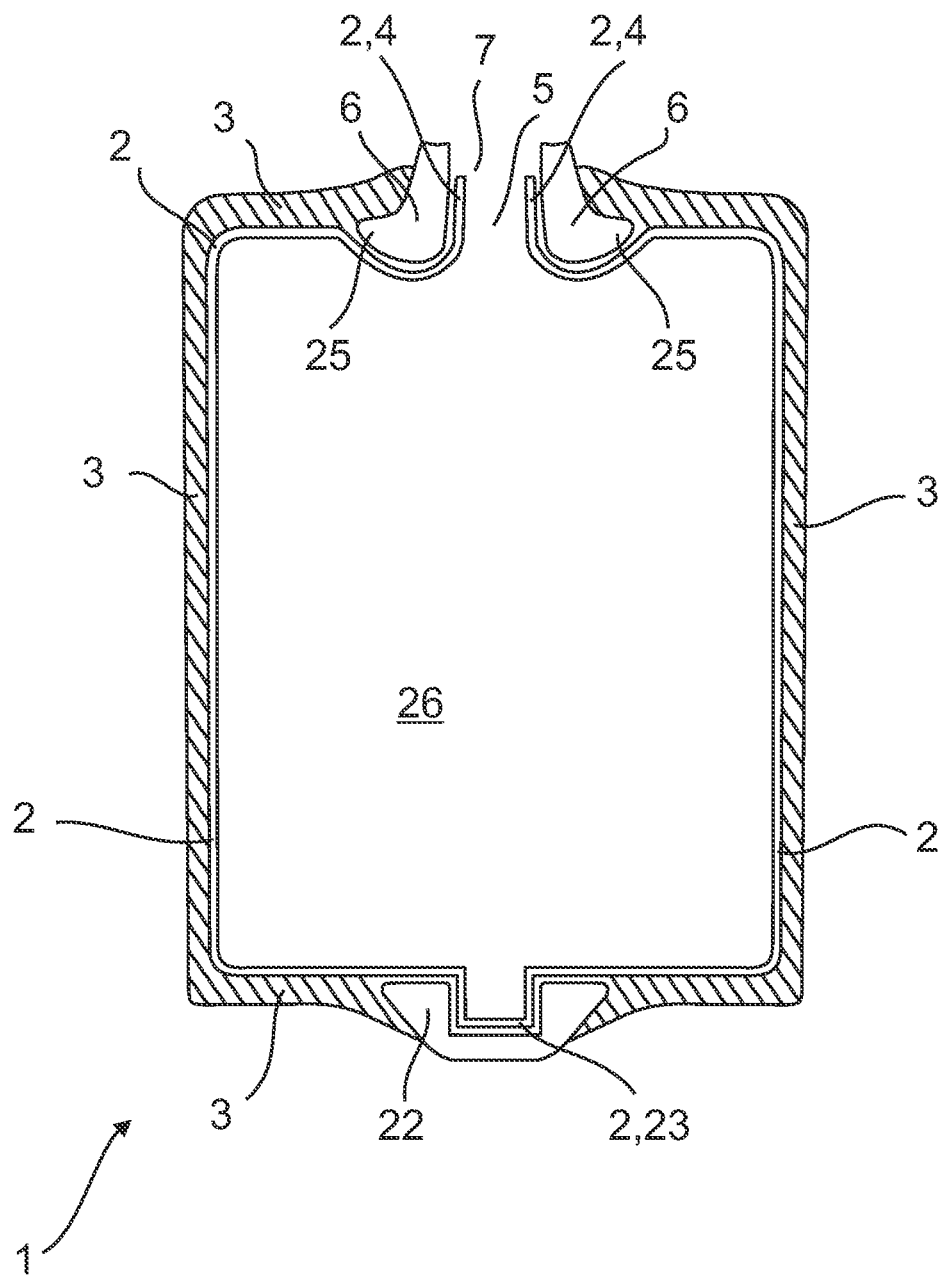
FIG. 1 shows a longitudinal section of a pressure container having a support sheath.

The pressure container 1 shown in FIG. 1 is provided for receiving a fluid, i.e. a liquid or a gas, under pressure. The pressure container 1 has a plastic container core 2, or a liner 2 made of plastic, manufactured, for example, by blow molding or rotational sintering. The plastic container core 2 is surrounded by a support sheath 3. The support sheath 3 is a fiber wrapping wound externally on the plastic container core 2. For example, the wrapping consists of reinforcing fibers, such as carbon, aramide, glass, boron or $Al_2O_3$ fibers, or mixtures thereof (hybrid fibers), which are embedded in a matrix of thermosetting plastics, such as epoxide or phenolic resins, or in thermoplastics, such as PA12, PA6, PP. Thus the support sheath 3 consists of the fibers and the matrix and is capable of taking up the pressure forces acting on the plastic container core 2 due to the fact that the fluid is stored in the plastic container core 2 under pressure. Thus, the fluid is stored or retained in an interior space 26 enclosed by the plastic container core 2. The plastic container core 2 is provided at the top with a connection piece 4 having an opening 5 and at the bottom with a projection 23. Therein the projection 23 is fluid-tight, and a lower neck piece 22, preferably made of metal, is applied to the outside of the projection 23. If required, this end of the pressure container 1 can also be provided with the invention disclosed herein. The outside of the connection piece 4 is enclosed by a connection body 6 or a boss 6 made of metal. Therein the connection body 6 also rests on a region of the plastic container core 2 adjoining the connection piece 4, especially because the connection body 6 with a bore 7 includes an annular flange 25. The pressure container 1 is shown in FIG. 1 without a valve body 8.

Figure 2:
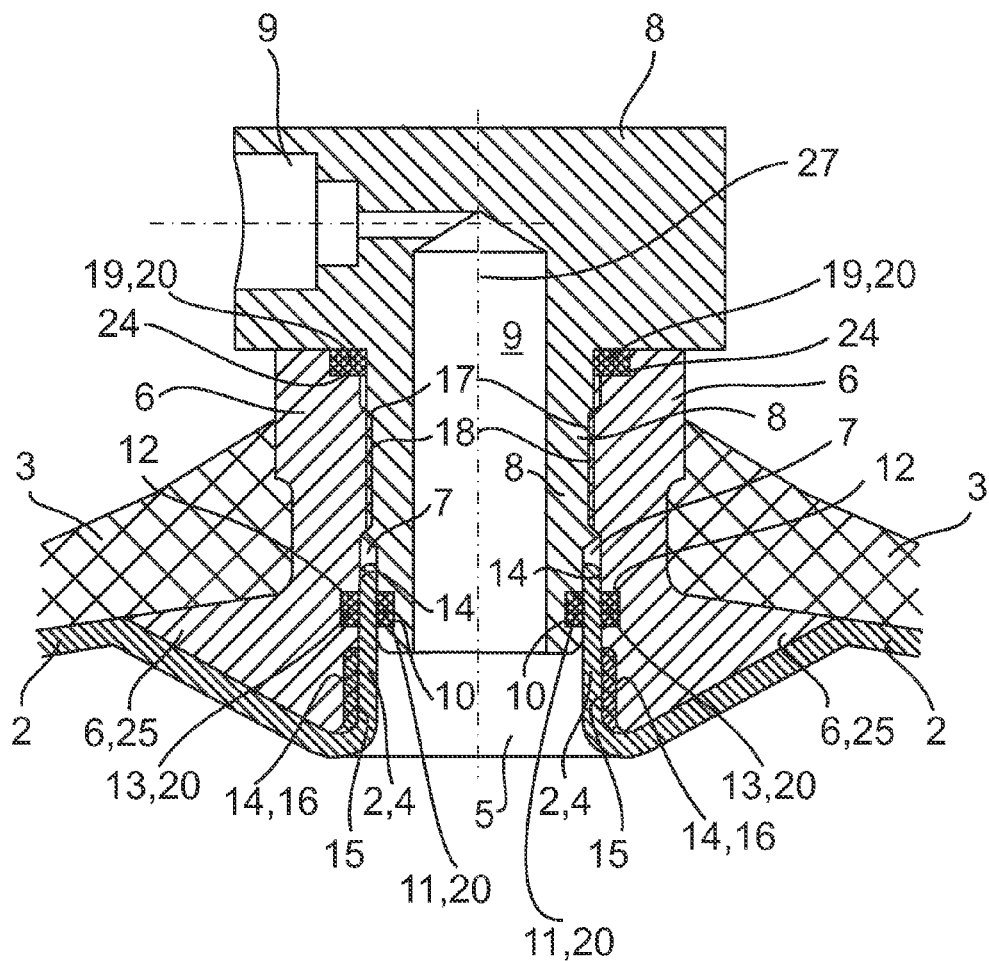
FIG. 2 shows a longitudinal section of a connection piece of the pressure container having a valve body and a connection body in a first exemplary embodiment.

FIG. 2 shows a first exemplary embodiment of the pressure container 1 in the region of the connection piece 4 with the valve body 8. The valve body 8 has a fluid duct 9 for passing through the fluid into the interior space 26 of the plastic container core 2, so that in this way the interior space 26 can be filled with the fluid and emptied. A part of the valve body 8 is arranged partially in the opening 5 of the connection piece 4, so that a part of the valve body 8 rests immediately on the outside of the connection piece 4 of the plastic container core 2. An annular groove 10 is formed at this region of the valve body 8 resting on the outside of the connection piece 4, and a first seal 11 is arranged in the annular groove 10 in or at a region of the connection piece 4 where both sides thereof are free from threads. This first seal 11, which is formed as an O-ring seal 20, thus rests immediately on the inside of the connection piece 4 and thus seals the connection piece 4 and the valve body 8 against one another in a fluid-tight manner. There is also an annular groove 12 incorporated at the inside of the connection body 6 or boss 6 made of metal, i.e. at the region of the connection body 6 limiting the bore V. A second seal 13 is arranged as an O-ring seal 20 in this annular groove 12 at the connection body 6 in or at the region of the connection piece 4 where both sides thereof are free from threads. Therein the connection body 6 at the inside of the bore 7 rests immediately on the outside of the connection piece 4. This portion 14 or region of the connection body 6 which rests immediately on the connection piece 4 is provided with this annular groove 12 with the second seal 13. Thereby the connection body 6 and the connection piece 4 are sealed in fluid-tight manner against one another. Therein the first seal 11 is designed for low temperatures. At low temperatures the connection piece 4 of the plastic container core 2 made of plastic contracts to a larger extent than the metal of the valve body 8, so that thereby the sealing behavior can be improved at low temperatures by means of the first seal 11. The second seal 13, which is arranged in the annular groove 12 at the connection body 6, is designed for high temperatures. At high temperatures the connection piece 4 expands to a larger extent than the connection body 6 or boss 6 made of metal, so that at high temperatures the connection body 6 is pressed against the second seal 13.

In addition to the annular groove 12 there is also a second thread 16 formed as an internal thread at the portion 14 of the connection body 6 resting on the connection piece 4, and there is provided a first thread 15 as an external thread at the lower end of the connection piece 4. Therein the first and the second threads 15, 16 are screwed into one another, so that thereby the connection body 6 is attached to the connection piece 4 and thus to the plastic container core 2 in the axial direction with respect to the opening 5. Further, a third thread 17 is formed as an internal thread at the connection body 6, and a fourth thread 18 is formed as an external thread at the valve body 8 (FIG. 2). The second thread 16 is screwed into the third thread 17, so that thereby the valve body 8, which is partially arranged in the bore 7 of the connection body 6, is connected in the axial direction to the connection body 6. A third seal 19 is arranged as an O-ring seal 20 in a recess 24 of the connection body 6, so that thereby a clearance between the connection body 6 and the valve body 8 is sealed in a fluid-tight manner. The connection piece 4 is arranged, in particular clamped, between a radially inside partial portion of the connection body 6 and a radially outside partial portion of the valve body 8, so that thereby a radial movement of the connection piece 4 is prevented by the clamping between the valve body 8 and the connection body 6. The support sheath 3 formed as a composite wrapping rests also on the connection body 6 made of metal in addition to the plastic container core 2.

Figure 3:
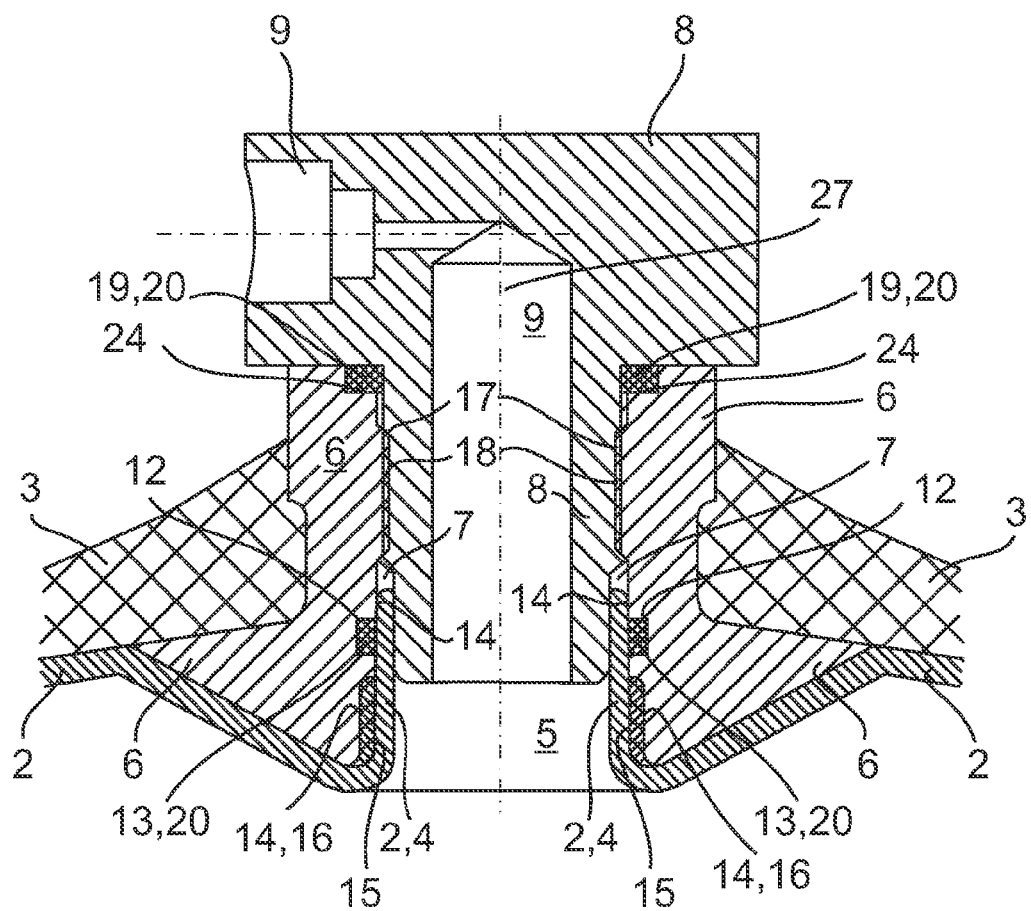
FIG. 3 shows a longitudinal section of the connection piece of the pressure container having the valve body and the connection body in a second exemplary embodiment.

FIG. 3 shows a second exemplary embodiment of the pressure container 1. The second exemplary embodiment shown in FIG. 3 differs from the first exemplary embodiment shown in FIG. 2 only by the fact that there is no annular groove 10 with a first seal 11 provided at the valve body 8.

The opening 5 and the bore 7 have an axis 27. Radial or tangential orientations are to be understood with reference to the axis 27, for example also in cases where the cross sections of the opening 5 and the bore 7 have a rectangular design. Thus, according to one embodiment, if the opening 5 or the bore 7 are rectangular, a radial orientation or direction is perpendicular to the axis 27 of the rectangular opening 5 and a tangential orientation or direction is the direction of a tangent on a circle having the axis 27 as the center, wherein a plane spanned by the circle is perpendicular to the axis 27.

In summary, the pressure container 1 according to the invention entails considerable advantages. The valve body 8 and the connection piece 4 are reliably sealed against one another, even in the case of temperature variations, and the constructional lengths in the axial direction of the connection piece 4, the valve body 8 and the connection body 6, which are components of the pressure container, are small.

The invention claimed is:

1. A pressure container, comprising
a plastic container core for storing a fluid under pressure;
a support sheath surrounding said plastic container core;
a plastic connection piece formed at said plastic container core and having an opening for filling in and discharging said fluid from said plastic container core;
a metallic connection body arranged radially outside said connection piece and having a bore;
a metallic valve body having a fluid duct for conducting said fluid in and out through said opening in said connection piece, wherein said valve body is arranged in said opening of said connection piece and in said bore of said connection body;
at least one annular groove formed radially outside in said valve body, one first seal being arranged in each of said at least one radially outside annular groove, so that said first seal rests radially inside on said connection piece; and
said connection body has at least one radially inside annular groove and a second seal is arranged in each of said at least one radially inside annular groove, so that said second seal rests radially outside on said connection piece, wherein said connection piece is sealed between said first seal radially inwardly and said second seal radially outwardly.

2. The pressure container according to claim 1, wherein only said second seal is arranged between said connection body and said connection piece of said plastic container core and said first seal is arranged at a region of said connection piece where both sides thereof are free from threads.

3. The pressure container according to claim 1, wherein said connection piece of said plastic container core is arranged between said connection body and said valve body.

4. The pressure container according to claim 3, wherein only said first seal is arranged between said connection piece of said plastic container core and said valve body.

5. The pressure container according to claim 1, wherein a third seal is arranged between said valve body and said connection body.

6. The pressure container containing according to claim 1, wherein the connection piece and the valve body are configured to have at least a seal between the connection piece and the valve body at low temperatures, and at least have a seal between the connection piece and the connection body at high temperatures.

* * * * *